United States Patent [19]

Otonari

[11] Patent Number: 5,045,384
[45] Date of Patent: Sep. 3, 1991

[54] POLYESTER LAMINATED FILM

[75] Inventor: Satoshi Otonari, Nagahama, Japan

[73] Assignee: Diafail Company, Limited Tokyo, Japan

[21] Appl. No.: 491,446

[22] Filed: Mar. 9, 1990

[30] Foreign Application Priority Data

Mar. 16, 1989 [JP] Japan .................................. 1-64756

[51] Int. Cl.$^5$ .............................................. B32B 7/02
[52] U.S. Cl. .................. 428/218; 428/314.4; 428/480; 428/910
[58] Field of Search ............... 428/480, 910, 218, 482, 428/314.4, 314.8, 316.6, 319.3, 916; 521/138; 283/904, 109, 110

[56] References Cited

U.S. PATENT DOCUMENTS 4,857,396 8/1989 Otonari et al. .................... 428/315.5
4,871,784 10/1989 Otonari et al. ....................... 521/138

FOREIGN PATENT DOCUMENTS 0322771 12/1988 European Pat. Off. .

Primary Examiner—Merrell C. Cashion, Jr.
Assistant Examiner—Robert J. Follett
Attorney, Agent, or Firm—David G. Conlin, Ernest V. Linek

[57] ABSTRACT

A polyester laminated film comprising a polyester inner layer having a density greater than 1.3 g/cm$^3$ and polyester outer layers on both sides of said inner layer having a density in the range of 0.4 to 1.3 g/cm$^3$ is disclosed. The laminated film of this invention has high discrimination property and is also improved in image printability on the film surface in comparison with the conventional polyester films. When, for instance, the present laminated film is used as base for prepaid cards, which is a preferred application of the present film, it contributes to the enhancement of security of the cards, and it also enables high-quality printing by thermal transfer method.

7 Claims, 1 Drawing Sheet

POLYESTER LAMINATED FILM

BACKGROUND OF THE INVENTION

The present invention relates to a polyester laminated film. More particularly the invention relates to a polyester laminated film which enables easy discrimination between the films by visual and/or optical means owing to incorporation of fine closed cells in the film surface layer and also has high-degree image printability in thermosensitive transfer recording. The present laminated film, therefore, finds particularly useful application as a base for various kinds of cards, bills and the like.

Polyester films, especially polyethylene terephthalate films, have been widely used as base for various kinds of commercial products, for example, as base for information recording media, condensers, printing plates for planography, packages, etc., owing to their excellent mechanical, electrical and surface properties, high chemical resistance and relatively low cost. For instance, white high-opacifying biaxially stretched polyester films are used because of their excellent properties, as base for magnetic cards such as telephone cards and orange cards (traffic fee prepaid cards) and for thermosensitive transfer recording media in the field of hard copies.

With a great spread of telephone cards or orange cards, introduction of prepaid cards has been considered positively in various types of business, such as service business, restaurant business, marketing business, etc., in recent years. Expansion of the scope of use of the cards and the increase of their users have brought about the problem of visual discrimination of one type of card from the other and, more seriously, the problem of security of the cards, that is, judgement of genuineness of the individual cards and prevention of forgery. Improvement on these matters has now become an important social requirement. Various attempts have been made for improving security of cards, such as storage of personal identity numbers in a coated magnetic strip and combination thereof with bar code or card punch. These methods, however, are not always satisfactory, and researches for a method with a higher degree of reliability are made.

Under these circumstances, it is required that the polyester film used as card base be provided with a forgery preventing ability or a function enabling easy judgement of genuineness.

Hitherto, various types of images such as letters, characters, figures have been printed on the card surface for allowing visual discrimination between the different types of cards. However, the method of directly printing an image on the card surface by thermosensitive transfer printing has not yet been applied to practical use. This is for the reason that because of rigidity of the base polyester film surface, transfer performance is bad and there may occur unevenness of image printing or partial omission of the printed image, making this method impractical. Improvement of this technique, therefore, has been strongly required.

As a base film that can give a solution to said problems, the present inventors have proposed a highly opacifying white polyester film containing a large number of fine closed cells all over the base film.

However, this film, although capable of improving transfer performance, is still not always satisfactory in respect of security. Thus, the development of a base film that can meet both requirements has been desired.

In view of these circumstances, the present inventors have pursued further studies for providing a base film which is excellent in both security characteristics and print transfer performance and, as a result, have accomplished the present invention.

SUMMARY OF THE INVENTION

The present invention provides a polyester laminated film comprising a polyester inner layer having a density greater than 1.3 g/cm$^3$ and polyester outer layers on both sides of said inner layer having a density in the range of 0.4 to 1.3 g/cm$^3$.

DETAILED DESCRIPTION OF THE INVENTION

Figure 1:
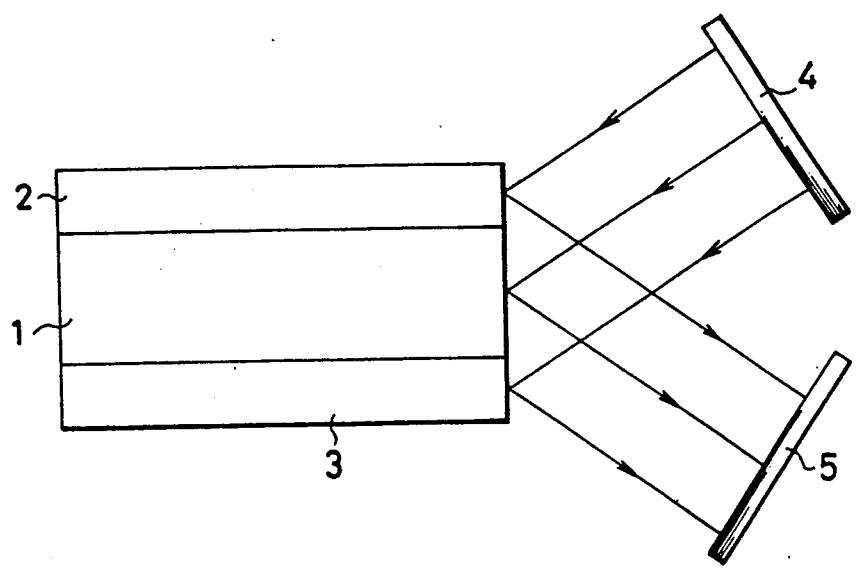
FIGS. 1 and 2 are schematic illustrations of a method for discrimination of a laminated film of the present invention by optical discrimination devices. In the drawings, numeral 1 indicates inner layer of the film, 2 and 3 outer layers, 4 light emitter, and 5 light receiver.

The polyester usable in the present invention includes those polyesters which are produced by polycondensing an aromatic dicarboxylic acid such as terephthalic acid, isophthalic acid, naphthalenedicarboxylic acid, etc., or an ester thereof and a glycol such as ethylene glycol, diethylene glycol, 1,4-butanediol, neopentyl glycol, etc. These polyesters can be produced by directly reacting the aromatic dicarboxylic acid and the glycol, by first performing an ester exchange reaction between an alkyl ester of the aromatic dicarboxylic acid and the glycol, and then conducting polycondensation, or by polycondensing a diglycol ester of the aromatic dicarboxylic acid. Typical examples of such polyesters are polyethylene terephthalate, polybutylene terephthalate, polyethylene-2,6-naphthalate and the like. Also, the polyesters used in the present invention may be a homopolyester or a copolyester.

In any event, the polyesters preferably used in the present invention are the ones having usually 70% by mole or more, preferably 80% by mole or more, more preferably 90% by mole or more of at least one unit selected from the group consisting of ethylene terephthalate unit, butylene terephthalate unit and ethylene-2,6-naphthalate unit as the constitutional repeating unit.

In the present invention, too low a polymerization degree of polyester leads to a reduced mechanical strength of the produced film, so that the polyester is preferred to have an intrinsic viscosity [$\eta$] of preferably 0.4 or above, more preferably 0.5 to 1.2, particularly preferably 0.5 to 0.85.

Usually, in the formation of polyester films, there is used a polyester containing an appropriate amount of fine particles inert to the polyester for providing slipperiness between the films or between film and metal rolls. In the present invention, however, it is preferred to use a polyester containing no such fine particles. This is for the reason that the presence of fine particles in the film may give an adverse effect to the control of color tone or opacifying properties of the obtained film. It is, however, possible to use a polyester containing fine particles so far as no adverse effect is given to color tone or opacifying properties required of the film.

In the present invention, the films which constitute the inner layer and the outer layer of the laminated film are produced by using the polyesters specified above. The important feature of the laminated films according to this invention is that the outer layers have a density which is smaller than that of the inner layer and falls within a specified range. The inner layer needs to have a density greater than 1.30 g/cm$^3$, preferably in the range of 1.35 to 1.50 g/cm$^3$. It is necessary that the density of the outer layers is in the range of 0.40 to 1.30 g/cm$^3$, preferably 0.50 to 1.20 g/cm$^3$. When the inner layer density is 1.30 g/cm$^3$ or less, non-uniformity of film thickness enlarges to give rise to trouble where transparency is required. Also, when the density of outer layers is greater than 1.30 g/cm$^3$, image reception in thermosensitive transfer process is deteriorated due to the reduced content of closed cells and the film becomes unsuitable as means for judgement of genuineness. On the other hand, when the outer layer density is less than 0.4 g/cm$^3$, the film surface quality is greatly deteriorated, resulting in poor printability of the film. The two outer layers may be the same or different in density as far as the densities of both layers are within the above-defined range.

Further, in case the laminated film of this invention is used for various types of cards, the thickness of the inner layer is preferably in the range of 50 to 500 $\mu$m and the thickness of the outer layers is preferably in the range of 5 to 100 $\mu$m, the inner layer thickness preferably being equal to or greater than the outer layer thickness. When the thickness of the outer layers is less than 5 $\mu$m, the opacifying properties of the film are deteriorated and the printed image on the film becomes unclear. Also, image reception at the time of thermosensitive transfer is deteriorated. However, other thickness relationship would be preferred when the laminated film of this invention is used for other purposes.

In the present invention, it is preferred that the polyester layer forming the inner layer be stretched in at least one direction. The stretching ratio is usually 2 to 6 times, preferably 2.5 to 5 times when uniaxially stretched, and 4 to 30 times preferably 9 to 20 times in terms of areal ratio when biaxially stretched. On the other hand, the polyester layer forming each outer layer is preferred to be stretched in the same manner as the inner layer, but may be stretched in a different manner and in a different ratio.

Known methods, for example the method disclosed in Japanese Patent Publication No. 30-5639, can be used for forming the inner layer. In this method, a usually used polyester is melt extruded into a slit form at a temperature in the range of 250° to 320° C. and then cooled and solidified at 40° to 80° C. to form an amorphous sheet. This sheet is then uniaxially stretched 2 to 6 times, preferably 2.5 to 5 times the original length in the machine direction or transverse direction, or biaxially stretched 4 to 30 times, preferably 9 to 20 times in terms of areal ratio; and then heat treated at 120° to 250° C.

Various methods are available for forming the outer layers containing a large number of fine cells. For instance, there can be used a method wherein a gas or a volatilizable substance is added to form a foamed layer (Japanese Patent Application Laid-Open (Kokai) Nos. 50-38765 and 57-34931, Japanese Patent Publication No. 57-46456, etc.); a method wherein a substance which can be chemically decomposed to generate a gas is added to form a foamed layer (Japanese Pat. Appln. Laid-Open (Kokai) No. 52-43871, Japanese Pat. Publication No. 58-50625, etc.); a method wherein a molded layer is impregnated with a liquid and the solvent-soluble substances are extracted to form a foamed layer (Japanese Pat. Appln. Laid-Open (Kokai) No. 51-34963, Japanese Pat. Publication No. 52-27666, etc.). These methods, however, have the necessity of using a particular molding apparatus and are also complicated in the process, so that they are not necessarily easily employable.

It is, therefore, preferred to employ the method proposed previously by the present inventors and described in Japanese Pat. Appln. Laid-Open (Kokai) No. 63-168441.

According to this method, a specified type of polypropylene or polymethylpentene is mixed with polyester, and the mixture is melt-kneaded at 250° to 320° C. in an extruder, extruded through a die and then cooled and solidified at 30° to 80° C. to form a substantially amorphous sheet. This sheet is then uniaxially stretched 2 to 6 times, preferably 2.5 to 5 times the original length in the machine direction or transverse direction, or biaxially stretched 4 to 30 times, preferably 9 to 20 times in terms of areal ratio, at a temperature above the glass transition point of the polyester, and further subjected to a heat treatment at 120° to 250° C. The polypropylene used in the above method is of the type having a melt flow index of usually 0.2 to 120 g/10min, preferably 0.5 to 50 g/10min, and the amount of the propylene mixed with polyester is usually in the range of 3 to 40% by weight, preferably 5 to 30% by weight based on the polyester. In case of using polymethylpentene, it should be of the type having a melt flow rate usually in the range of 1 to 100 g/10min, preferably 5 to 80 g/10min, more preferably 10 to 70 g/10min, and the amount of the polymethylpentene mixed with polyester is usually in the range of 3 to 40% by weight, preferably 5 to 30% by weight based on the polyester.

In the present invention, the method for laminating the inner layer and the outer layers is not subject to any specific restrictions. For instance, the separately prepared inner and outer layers may be laminated with an adhesive, or the outer layers may be melt-extruded and laminated on the inner layer in a certain step of preparation of the inner layer. In the present invention, however, it is especially preferred to employ a lamination method using the so-called co-extrusion technique in view of productivity and security. In this method, the material forming the inner layer and the material forming the outer layers are melted in the separate extruders and then fed into a die whereby the inner and outer layers are laminated in a molten state and extruded through a slit to obtain a laminated sheet. Use of this method can eliminate the difference in heat shrink between the inner and outer layers and can also prevent the troubles such as curling resulting from heat history in the working process, etc. Also, the problem of break of film is involved in the production of outer layers alone, but according to this method, such a problem is eliminated to realize a marked enhancement of productivity. Further, this method enables film production at low cost and makes forgery very difficult.

The above-mentioned method using the coextrusion technique, which is especially preferred for use in the present invention, will be described in more detail below.

As the material for forming the inner layer, namely a film layer which is substantially free of closed cells and has a density greater than 1.30 g/cm$^3$, the polyester described above is used. On the other hand a blend of the polyester described above and 3 to 40 wt% based on the polyester of a specific polypropylene and/or polymethylpentene is used as the material for forming each outer layer, viz. a film layer which contains numerous fine closed cells and has a density in the range of 0.40 to 1.30 g/cm³. These materials are supplied into separate extruders and melt-kneaded at 250° to 320° C., and then they are supplied into a die through conduits, whereby the materials are laminated in a molten state so that the outer layers are formed on both sides of the inner layer and extruded through a slit into a form of a sheet, which is then cooled to a temperature below about 80° C. to obtain a laminated sheet in which both of the inner and outer layers are substantially amorphous. The thus obtained laminated sheet is then uniaxially stretched 2 to 6 times, preferably 2.5 to 5 times the original length in the machine direction or transverse direction, or biaxially stretched 4 to 30 times, preferably 9 to 20 times in terms of areal ratio, at a temperature above the glass transition point of polyester, and further subjected to a heat treatment at 120° to 250° C.

In this method, it is possible to easily control the thickness of both inner and outer layers by changing the extrusion rate of the respective extruders.

The laminated film of the present invention can be obtained in the manner described above. In the present invention, however, the inner and/or outer layers may contain other additives as far as the object of the invention can be attained. As the additives, there can be mentioned, for example, antioxidant, antistatic agent, ultraviolet absorber, pigment, dye, lubricant, matting agent, fluorescent whitener, surfactant and the like. These additives may be blended as desired by a suitable method in a necessary amount. Especially when the laminated film of the present invention is used as based for prepaid cards, a pigment such as carbon black, titanium oxide or barium sulfate is preferably blended in the inner layer, and a white pigment such as titanium oxide or calcium carbonate and/or a surfactant, especially a silicone surfactant, are preferably used in the outer layers.

Also, the laminated film of the present invention may be subjected to various kinds of surface treatment for improving the required properties, for example, the surface properties such as adhesiveness, releasability, antistatic properties, slipperiness, etc., according to the purpose of use of the film. The surface treatments applicable to the laminated film of the present invention include various kinds of primer coating, corona discharge treatment, plasma treatment, ionic plating, ultraviolet ray treatment, radiation treatment, solvent treatment, flame treatment, sandblasting, etc. Such surface treatment may be conducted on one or both sides of the laminated film at a suitable time and to a necessary extent. It is possible to perform two or more different types of surface treatment, and when the surface treatment is conducted on both sides of the laminated film, such surface treatment may be of the same or different types.

The laminated film of the present invention has an opacifying degree of not less than 0.5 and a tear strength of not less than 3 kg.cm/cm².

The present invention will hereinafter be described more particularly by showing the examples thereof, but it is to be understood that these examples are merely intended to be illustrative and not to be construed as limiting the scope of the invention. The measurements of various properties in the present invention were made by the methods described below.

(1) Film density (g/cm³)

Five sample pieces were cut out from the optionally selected portions of the laminated film. The weight per unit volume of each sample was measured and the average of measurements on the five samples was given as the density of the laminated film. Then thickness of the inner and outer layers at the sectional view was measured by a microscope, and the outer layers of the laminated film surface was removed by a microtome. The weight per unit volume of the inner layer was measured to determine the density. The density of the outer layer was calculated from the above results.

(2) Opacifying degree

Visual light transmission density was measured by using a Macbeth densitometer TD-904. Measurement was made at five points, and the average of 5 measurements was shown as opacifying degree. The higher the opacifying degree, the lower the light transmittance.

(3) Tear strength (kg.cm/cm2)

A 5 cm ×5 cm sample piece was cut out from an arbitrary portion of the film, and its tear strength was measured according to JIS P-8116. Measurement was made at 5 points in each of machine direction and transverse direction of the film, and the average of 10 measurements was given as tear strength.

(4) Evaluation of discrimination property

Figure 2:
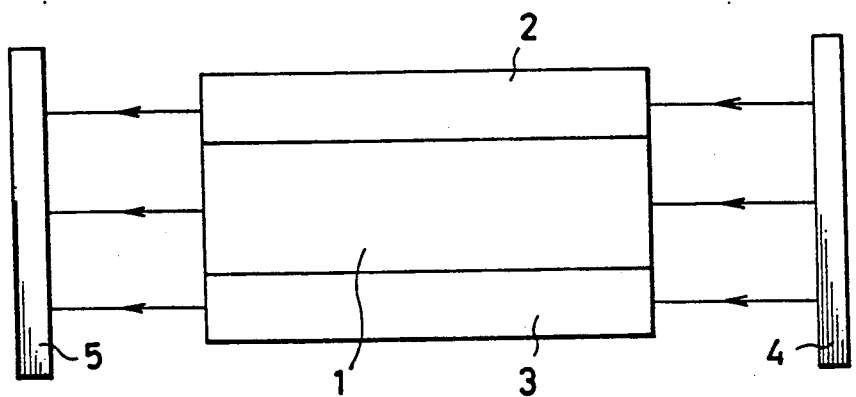

A section of each sample film was visually observed, and the samples which could be evidently judged to have a three-layer structure were given O mark and the samples which couldn't were given X mark. Also, the samples which could be discriminated by the card discriminating systems shown in FIGS. 1 and 2 were given O mark and the samples which were hard to discriminate were given X mark.

(5) Evaluation of image printability

Each sample film cut to A4 size was subjected to thermal transfer recording by using a color printer Model CX-5000 mfd. by Sharp Corp. The condition of the obtained hard copies was visually observed, and the samples with good image printability as judged from image density, partial omission of image and image definition were given O mark and the samples which were poor in image printability and not suitable for practical use were given X mark.

EXAMPLE 1

The material A comprising polyethylene terephthalate chips containing 0.4 wt% of carbon black and having an intrinsic viscosity of 0.67 and the material B prepared by uniformly blending 15 wt% of crystalline polypropylene chips having a melt flow index of 10 g/10min with polyethylene terephthalate chips having an intrinsic viscosity of 0.68 were supplied into the separate extruders and melted at 290° C. The respective melts were fed into a die and laminated so that the material A would form an inner layer while the material B would form outer layers on both sides of said inner layer, and the laminated melt was extruded into a slit form and cooled on a 40° C. cooling drum to obtain a three-layer co-extruded non-stretched sheet. This sheet was then stretched 3.2 times in both machine and transverse directions and heat treated at 230° C. for 5 seconds to obtain a film having a thickness of 250 μm and a density of 1.19 g/cm³. This film had a three-layer structure of which the inner layer was 150 μm in thickness and 1.41 g/cm³ in density while each of the outer layers which contained a large number of fine closed cells was 50 μm in thickness and 0.85 g/cm³ in density. The film properties and the results of quality evaluation are shown in Table 1, which indicates excellent visual discrimination and image printability of the film.

EXAMPLE 2

A laminated film having a thickness of 250 μm and a density of 1.19 g/cm³ was obtained by following the same film-forming procedure as in Example 1 except that polyethylene terephthalate chips having an intrinsic viscosity of 0.66 was used in place of the material A, and that the amount of polypropylene blended in the material B was changed to 10 wt%. The inner layer of the obtained film was 100 μm in thickness and 1.40 g/cm³ in density while each of the outer layers was 75 μm in thickness and 1.05 g/cm³ in density. This film showed the same excellent discrimination and image printability as the film of Example 1.

EXAMPLE 3

By following the same film-forming procedure as in Example 1 except that polyethylene terephthalate chips which contain 15 wt% of titanium oxide having an average particle size of 0.3 μm and has an intrinsic viscosity of 0.68 was used in place of the material A, and that the amount of polypropylene blended in the material B was changed to 20 wt%, there was obtained a film having an overall thickness of 100 μm, in which the inner layer had a thickness of 50 μm and a density of 1.46 g/cm³ and each of the outer layers had a thickness of 25 μm and a density of 0.75 g/cm³. This film was not so good in discrimination but excellent in image printability.

COMPARATIVE EXAMPLE 1

By carrying out film forming operations according to Example 1 by using material A alone, without performing co-extrusion lamination conducted in Example 1, there was obtained a black film having a thickness of 250 μm and a density of 1.41 g/cm³. This film was very poor in image printability.

COMPARATIVE EXAMPLE 2

By following the same film forming procedure as Example 1 except that polyethylene terephthalate chips used as the material A in Example 1 were uniformly blended with 8 wt% of polymethylpentene chips having a melt flow rate of 15 g/10min, and that the material A of Example 3 was used as the material B, there was obtained a laminated film having an overall thickness of 250 μm, in which the inner layer had a thickness of 150 μm and a density of 1.05 g/cm³ and each of the outer layers had a thickness of 50 μm and a density of 1.46 g/cm³. This film had good discrimination but was poor in image printability as is the film of Comparative Example 1.

COMPARATIVE EXAMPLE 3

By following the same film forming process as Example 2 except that the amount of polypropylene blended in material B was changed to 3 wt%, there was obtained a laminated film having an overall thickness of 250 μm, in which the inner layer was 100 μm in thickness and 1.40 g/cm³ in density while each of the outer layers was 75 μm in thickness and 1.35 g/cm³ in density. This film was inferior to the film of Example 1 in image printability.

COMPARATIVE EXAMPLE 4

By carrying out the same film forming process as Example 1 except that the material B of Example 2 was used as the material A and that the material B of Example 3 was used as the material B, there was obtained a laminated film having an overall thickness of 250 μm, in which the inner layer had a thickness of 100 μm and a density of 1.04 g/cm³ and each of the outer layers had a thickness of 75 μm and a density of 0.76 g/cm³. This film showed good image printability but was very poor in discrimination.

COMPARATIVE EXAMPLE 5

By carrying out the film forming operations according to Example 1 by using the material A of Example 3 alone, without performing co-extrusion, there was obtained a white film having a thickness of 100 μm and a density of 1.46 g/cm³. Both sides of this film were coated with a polyester resin containing a solvent-soluble substance and titanium oxide. After drying the coat, it was subjected to solvent extraction to obtain a laminated film having an outer layer thickness of 10 μm and density of 0.20 g/cm³. This film was inferior to the film of Example 1 in both discrimination and image printability.

The results of property evaluations of the films obtained in the above Examples and Comparative Examples are shown collectively in Table 1.

TABLE 1

| | Film structure | | | | Film properties | | Discrimination | | | Image printability | | |
|---|---|---|---|---|---|---|---|---|---|---|---|---|
| | Inner layer | | Outer layer | | | | | Optical | | | | |
| | Density (g/cm³) | Thickness (μm) | Density (g/cm³) | Thickness (μm) | Opacifying degree | Tear strength (kg.cm/cm²) | Visual | Transmission | Reflection | Image density | Omission of image | Image definition |
| Example 1 | 1.41 | 150 | 0.85 | 50 | >5.0 | 10 | ○ | △ | ○ | ○ | ○ | ○ |
| Example 2 | 1.40 | 100 | 1.05 | 75 | 1.2 | 8 | ○ | ○ | ○ | ○ | ○ | ○ |
| Example 3 | 1.46 | 50 | 0.75 | 25 | 1.0 | 9 | △ | △ | △ | ○ | ○ | ○ |
| Comp. Example 1 | 1.41 | 250 | — | — | >5.0 | 14 | x | x | x | x | x | x |
| Comp. Example 2 | 1.05 | 150 | 1.46 | 50 | 4.5 | 12 | ○ | △ | ○ | △ | x | x |
| Comp. Example 3 | 1.40 | 100 | 1.35 | 75 | 0.4 | 13 | △ | ○ | △ | △ | △ | △ |
| Comp. Example 4 | 1.04 | 100 | 0.76 | 75 | 0.8 | 4 | x | x | x | ○ | ○ | ○ |
| Comp. Example 5 | 1.46 | 100 | 0.20 | 10 | 1.1 | 14 | △ | △ | △ | △ | △ | △ |

What is claimed is:

1. A polyester laminated film comprising three discrete layers; an inner layer surrounded by two outer layers, said polyester inner layer having a density greater than 1.3 g/cm$^3$ and said two polyester outer layers on both sides of said inner layer containing fine closed cells and having a density in the range of 0.4 to 1.3 g/cm$^3$.

2. The polyester laminated film according to claim 1, wherein said inner layer is a polyester comprising dicarboxylic acid units derived from at least one acid selected from the group consisting of terephthalic acid, isophthalic acid and naphthalenedicarboxylic acid, and glycol units derived from at least one glycol selected from the group consisting of ethylene glycol, diethylene glycol, 1,4-butanediol and neopentyl glycol, the intrinsic viscosity of said polyester being not less than 0.4.

3. The polyester laminated film according to claim 1, wherein said outer layer comprises a polyester having an intrinsic viscosity of not less than 0.4 and comprising dicarboxylic acid units derived from at least one acid selected from the group consisting of terephthalic acid, isophthalic acid and naphthalenedicarboxylic acid, and glycol units derived from at least one glycol selected from the group consisting of ethylene glycol, diethylene glycol, 1,4-butanediol and neopentyl glycol; and 3 to 40 wt%, based on said polyester, of polypropylene or polymethylpentene.

4. The polyester laminated film according to claim 3, wherein the melt flow index of said polypropylene is 0.2 to 120 g/10min.

5. The polyester laminated film according to claim 3, wherein the melt flow rate of said polymethylpentene is 1 to 100 g/10min.

6. The polyester laminated film according to claim 1, wherein said inner layer and said outer layers are stretched at least one direction of the machine direction and transverse direction.

7. The polyester laminated film according to claim 1, wherein said inner layer and said outer layers are laminated by co-extrusion technique.

* * * * *

UNITED STATES PATENT AND TRADEMARK OFFICE
CERTIFICATE OF CORRECTION

PATENT NO. : 5,045,384

DATED : September 3, 1991

INVENTOR(S) : Satoshi Otonari

It is certified that error appears in the above-identified patent and that said Letters Patent is hereby corrected as shown below:

Claim 1;
Col. 9, line 4, change "greater than 1.3 $g/cm^3$" to
--1.35 to 1.50 $g/cm^3$--

Signed and Sealed this

First Day of September, 1992

Attest:

DOUGLAS B. COMER

Attesting Officer

Acting Commissioner of Patents and Trademarks